US007406915B2

(12) United States Patent
Yoo

(10) Patent No.: US 7,406,915 B2
(45) Date of Patent: Aug. 5, 2008

(54) METHOD FOR FORMING BLACK MATRIX OF LIQUID CRYSTAL DISPLAY DEVICE

(75) Inventor: Hong-Suk Yoo, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 382 days.

(21) Appl. No.: 11/113,198

(22) Filed: Apr. 25, 2005

(65) Prior Publication Data

US 2005/0241513 A1 Nov. 3, 2005

(30) Foreign Application Priority Data

Apr. 30, 2004 (KR) ...................... 10-2004-0030763

(51) Int. Cl.
*B41M 1/10* (2006.01)
*B41F 17/14* (2006.01)
*G02F 1/13* (2006.01)

(52) U.S. Cl. ....................... 101/170; 101/150; 101/153; 101/158; 101/492

(58) Field of Classification Search ................... 101/41, 101/153-155, 157-158, 170, 149, 450.1, 101/483, 163, 167, 492; 349/187; 430/7
See application file for complete search history.

(56) References Cited

U.S. PATENT DOCUMENTS

| | | | | |
|---|---|---|---|---|
| 5,127,330 A * | 7/1992 | Okazaki et al. | .......... | 101/450.1 |
| 6,650,051 B1 * | 11/2003 | Park et al. | .................... | 313/582 |
| 7,243,599 B2 * | 7/2007 | Yoo et al. | .................... | 101/170 |
| 2002/0140339 A1 * | 10/2002 | Lee et al. | .................... | 313/466 |

FOREIGN PATENT DOCUMENTS

| | | |
|---|---|---|
| JP | 58191188 | * 11/1983 |
| JP | 2000028815 | * 1/2000 |
| JP | 2000223886 | * 8/2000 |
| KR | 2003-827614 | * 12/2001 |

* cited by examiner

*Primary Examiner*—Daniel J. Colilla
*Assistant Examiner*—M. L Ferguson-Samreth
(74) *Attorney, Agent, or Firm*—McKenna Long & Aldridge LLP

(57) ABSTRACT

A method for forming black matrixes of a liquid crystal display device is provided that includes preparing a transparent substrate, printing first black matrixes on the substrate, and printing second black matrixes on the first black matrixes.

10 Claims, 7 Drawing Sheets

METHOD FOR FORMING BLACK MATRIX OF LIQUID CRYSTAL DISPLAY DEVICE

This application claims the benefit of Korean Patent Application No. 30763, filed on Apr. 30, 2004, which is hereby incorporated by reference for all purposes as if fully set forth herein.

BACKGROUND OF THE INVENTION

1. Field of the Invention

The present invention relates to a liquid crystal display device, and more particularly, to a printing method for forming black matrixes in a liquid crystal display device.

2. Description of the Related Art

Demands for a light, thin, small flat panel display devices is increasing due to the development of various portable electronic devices, such as mobile phones, PDAs, notebook computers, and the like. As a result, there has been an increase in research with regard to flat panel display devices including an LCD (Liquid Crystal Display), a PDP (Plasma Display Panel), an FED (Field Emission Display), a VFD (Vacuum Fluorescent Display) and the like. Liquid crystal display devices are receiving much attention thanks to its simple mass-production technique, easy driving system and implementation of a high picture quality.

FIG. 1 is a schematic view illustrating a section of a general liquid crystal display device. As illustrated in FIG. 1, a liquid crystal display device 1 includes a lower substrate 5, an upper substrate 3 and a liquid crystal layer 7 formed between the lower substrate 5 and the upper substrate 3. A pixel electrode and a common electrode (not shown) are respectively formed on the lower substrate 5 and the upper substrate 3, and an alignment layer (not shown) for aligning liquid crystal molecules of the liquid crystal layer 7 is formed on the pixel electrode and on the common electrode.

The lower substrate 5 is a driving unit array substrate including a plurality of pixels (not shown). Each pixel includes a driving unit such as a thin film transistor. The upper substrate 3 is a color filter substrate including a color filter layer for implementing a color.

The lower substrate 5 and the upper substrate 3 are attached by a sealing material 9, and the liquid crystal layer 7 is formed there between. The liquid crystal molecules of the liquid crystal layer are driven by a driving unit (not shown) formed on the lower substrate 5 and the quantity of light transmitting the liquid crystal layer is controlled to display information.

The lower substrate 5 is formed by a driving device array process for forming the driving device at the lower substrate 5, and the upper substrate 3 is formed by a color filter process for forming a color filter.

The driving device array process includes forming a plurality of gate lines and data lines which are arranged on the lower substrate 5 and define pixel regions, forming at each pixel region a thin film transistor which is the driving device to be connected to the gate lines and data lines, and then forming a pixel electrode for driving the liquid crystal layer by applying a signal through the thin film transistor which is connected thereto (to the pixel electrode).

Furthermore, the color filter process is achieved by forming black matrixes on the upper substrate 3, forming a color filter on the black matrixes, and forming a common electrode on the color filter. The black matrixes are formed using a single layer of metal material having excellent reflective properties such as Cr or CrOx, or a double layer which shields light more effectively. However, the double layer black matrixes requires a photolithographic process. In general, black matrixes made of a metal pattern are fabricated using a photolithographic process, which includes complicated processes such as metal film deposition, exposure, development, and strip processes. As a result, the addition of the photolithographic process decreases productivity.

Alternatively, the black matrixes may be made of a resin BM. The black matrix resin is thicker than the metal layer in order to effectively block light. That is, because the resin BM uses a spin coater, it has a limit to reduce a thickness. However, as the resin BM becomes thicker, an occurrence of step difference is deepened. In order to solve the problem, an overcoat layer has to be formed, or after forming the resin BM, a polishing process for eliminating its surface has to be applied thereto.

Thus, in both related art black matrix forming processes productivity is reduced due to the required additional process. For example, when employing the double metal layer, the photolithographic process is further required, and when employing the resin BM, the overcoat layer forming or polishing process is further required.

SUMMARY OF THE INVENTION

Accordingly, the present invention is directed to a method of forming black matrixes in an liquid crystal display device that substantially obviates one or more of the problems due to limitations and disadvantages of the related art.

Therefore, an advantage of the present invention is to provide a printing method for forming black matrixes in a liquid crystal display device which simplifies the required processes and improves productivity.

Another advantage of the present invention is to provide a printing method for forming multi-layered black matrixes in a liquid crystal display device capable of shielding light effectively.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a method for forming black matrixes in a liquid crystal display device comprising: preparing a transparent substrate, printing first black matrixes on the substrate, and printing second black matrixes on the first black matrixes.

In another aspect of the present invention, there is provided a method for forming black matrixes in a liquid crystal display device, the method comprising: providing first and second printing rollers having a plurality of convex patterns corresponding to patterns of the black matrixes to be formed; depositing a black matrix resin on the convex patterns; forming first black matrixes on a substrate by rotating the first printing roller across the surface of a substrate such that the black matrix resin deposited on the convex patterns of the first printing roller is transferred onto the substrate; and forming second black matrixes on the first black matrixes by rotating the second printing roller across the substrate such that the black matrix deposited on the convex patterns of the second printing roller is transferred onto the first black matrixes formed on the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to embodiments of the present invention, examples of which are illustrated in the accompanying drawings.

Hereinafter, a printing method for forming black matrixes in a liquid crystal display device in accordance with the present invention will be described with reference to the attached drawings.

Figure 1:
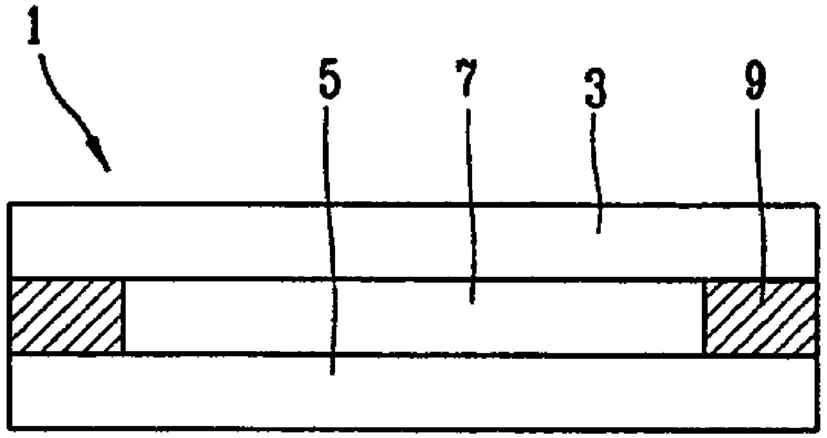
FIG. 1 RELATED ART
FIG. 1 is a cross-sectional view illustrating a typical liquid crystal display device.
Figure 2A:
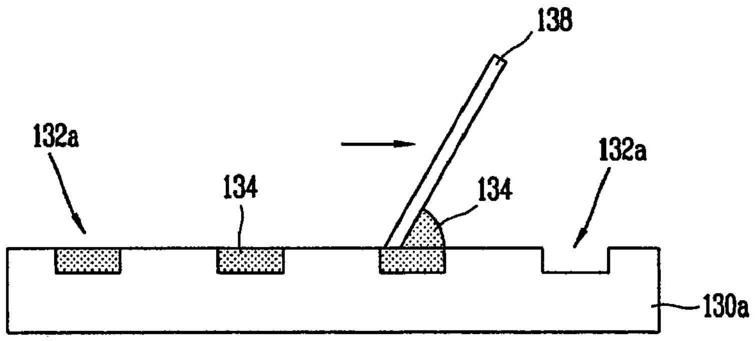
FIGS. 2A to 2F illustrate a method for forming black matrixes in accordance with a first embodiment of the present invention.

FIGS. 2A to 2F illustrates a method for forming black matrixes according to a first embodiment of the present invention. First, as illustrated in FIG. 2A, a concave plate or first cliché 130*a* is provided with a plurality of grooves 132*a* formed at specific positions. The plurality of grooves are then filled with a black matrix resin 134. The plurality of grooves 132*a* are formed in the first cliché using a typical photolithographic method. Each of the plurality of grooves 132*a* are filled with the resin BM 134 by depositing the resin on the first cliché 130*a* and thereafter pushing a blade 138, which is in contact with the surface, over the first cliché 130*a*. As a result, the resin is filled in the plurality of grooves 132*a* according to the movement of the blade 138, while any resin remaining on the surface of the first cliché 130*a* is eliminated.

Accordingly the thickness of the BM to be form is determined by the depth of the first groove 132*a*. When the depth of the first groove 132*a* is shallow, a relatively thin BM is formed and vice versa.

Figure 2B:
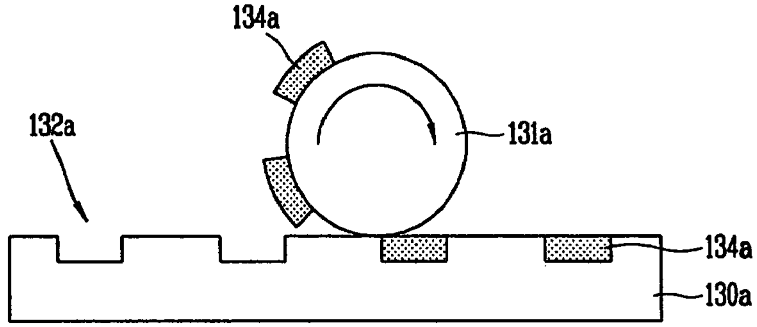

Referring to FIG. 2B, the black matrix resin 134 filled in the plurality of grooves 132*a* on the first cliché 130*a* is transferred onto the surface of a first printing roller 131*a* which contacts the surface of the first cliché by rotating the roller over the surface of the first cliché 130*a*, resulting in the first resin BM patterns 134*a* being formed on the first printing roller 131*a*. The first printing roll 131*a* has a width similar to that of a panel of a display device to be fabricated, and also has a length of circumference similar to the length of the panel. Therefore, all the resin BM 134 filled in the first grooves 132*a* of the first cliché 130*a* is completely transferred onto the circumferential surface of the first printing roll 131*a* with only one rotation over the surface of the first cliché.

Figure 2C:
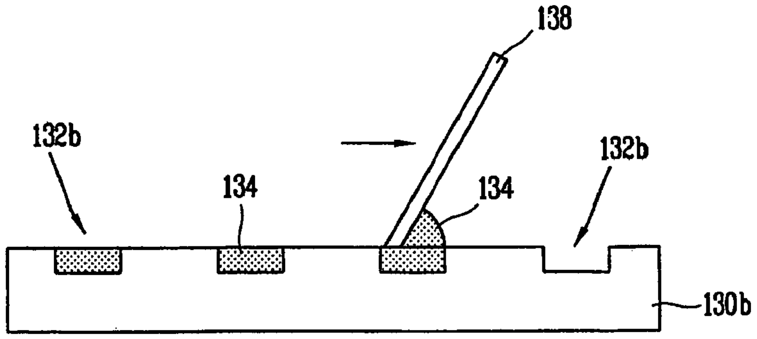
Figure 2D:
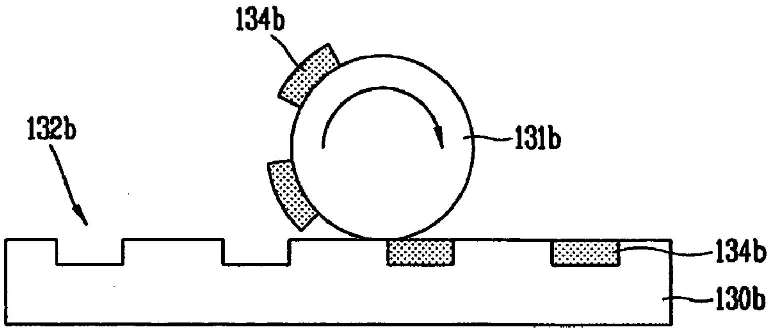
Figure 2E:
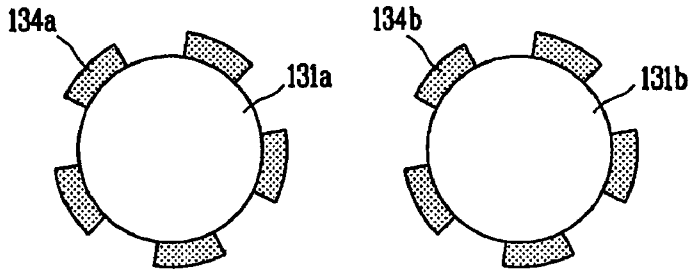

As illustrated in FIGS. 2C and 2D, a second cliché 130*b* is prepared using a similar method to the first cliché illustrated in FIGS. 2A and 2B. Furthermore, after filling the black matrix resin 134 in each of the plurality of grooves 132*b* formed in the second cliché 130*b*, the resin 134 in the second grooves 132*b* is transferred onto a surface of a second printing roller 131*b*. Accordingly, as illustrated in FIG. 2E, the first printing roll 131*a* having the first resin BM patterns 134*a* formed thereon and the second printing roll 131*b* having second resin BM patterns 134*b* formed thereon are prepared.

Figure 2F:
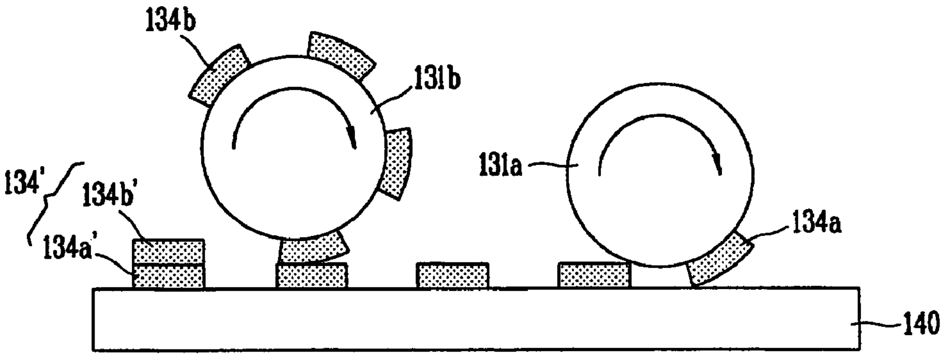

Thereafter, as illustrated in FIG. 2F, the first printing roller 131*a* is rotated across the surface of a substrate 140, thereby transferring the first resin BM patterns 134*a* onto the substrate 140. Next, the second printing roller 131*b* is rotated across the surface of the substrate 140, thereby transferring the second resin BM patterns 134*b* onto the first black matrixes 134*a*'. The interfaces respectively formed between the first black matrixes 134*a*' and the second black matrixes 134*b*' improve the light blocking efficiency of the matrixes. Therefore, even if the first and second black matrixes 134*a*' and 134*b*' are formed of the same material, because the second black matrixes 134*b*' are formed on the first black matrixes 134*a*' after a solvent contained in the first black matrixes 134*a*' completely volatilizes, the interfaces formed between the first and second black matrixes 134*a*' and 134*b*' improves the light block properties of the matrixes.

Alternatively, after transferring the first black matrixes 134*a*' onto the substrate 140 the substrate may be irradiated with UV or heat to increase the volatility of the solvent and then the second black matrixes 134*b*' are transferred onto the first black matrixes 134*a*'. Thus, by irradiating the substrate with UV or heat after forming the first black matrixes 134*a*' the interfaces is formed more reliably.

Furthermore, after forming the first black matrixes 134*a*', nano particle layers (not shown) may be formed on the first black matrixes 134*a*'. Because the nano particle layers degrade light transmission efficiency, forming the nano particle layers between the first black matrixes 134*a*' and the second black matrixes 134*b*' improves the light blocking properties of the matrixes.

Therefore, using the method according to the present invention, a thinner black matrix can used with out decreasing the light blocking efficiency of the matrix. That is, as varying a groove depth of the cliché, a facilitation of adjustment for the thickness of the black matrix can be achieved and a black matrix having a multi-layer can be formed by using the resin BM, so that the light blocking efficiency can be increased and the BM thickness can be reduced, compared with the related art. Accordingly, even if not forming an overcoat layer, because the black matrixes can be formed by the printing method, processes for forming the black matrixes can be simplified compared with the related art, although a multi-layer BM is formed.

When the first printing roller 131*a* forms the first black matrixes 134*a*' on the substrate 140, because the second printing roll 131*b* forms the second black matrixes 134*b*' on the first black matrixes 134*a*' after the first and second printing rolls 131*a* and 131*b* pass the substrate 140, black matrixes 134' including the first black matrixes 134*a*' and the second black matrixes 134*b*' are formed on the substrate 140. At this time, the second black matrixes 134*b*' must be formed exactly on the first black matrixes 134*a*'. That is, as the first printing roll 131*a* and the second printing roll 131*b* are allowed to be exactly aligned with the substrate 140, the second black matrixes 134*b*' have to be formed on the first black matrixes

134*a*'. However, in real processes, the first black matrixes 134*a*' may be formed greater, considering the alignment error between the first and second printing rolls 131*a* and 131*b*. Furthermore, the thickness of the first black matrixes 134*a*' can be formed different from that of the second black matrixes 134*b*', and each thickness of the first and second black matrixes 134*a*' and 134*b*' can be adjusted by the groove thickness of the cliché.

Thus, in the present invention, because the thickness of the black matrix can be determined by adjusting the thickness of the groove formed in the cliché, even if using the resin BM, the thickness of the black matrix can be thinner than that in the related art. Therefore, the overcoat layer can be emitted when using the resin BM.

Figure 3A:
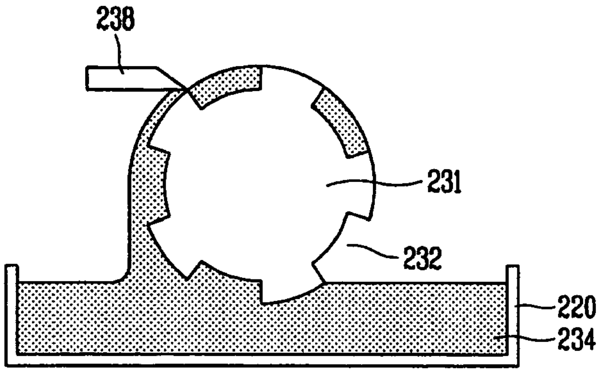
FIGS. 3A to 3C illustrate a method for forming black matrixes according to a second embodiment of the invention.
Figure 3B:
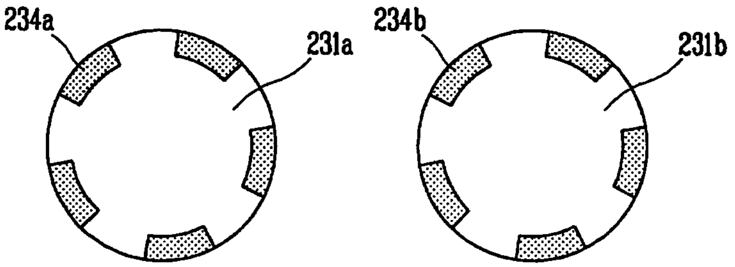
Figure 3C:
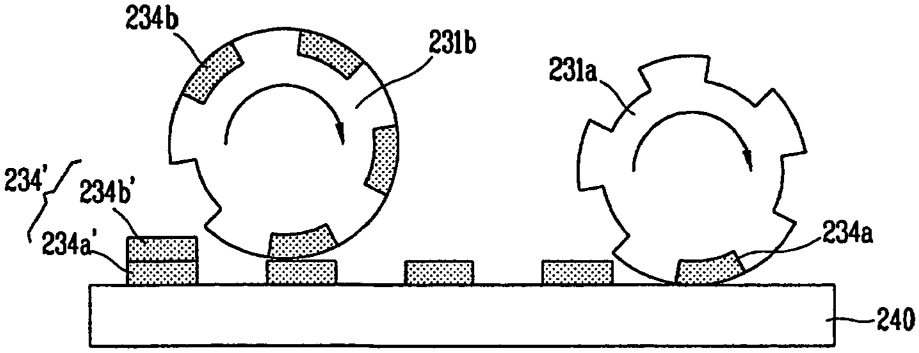

According to a second embodiment of the present invention, the black matrixes are printed on the substrate by forming grooves on the surface of the printing roller without using the cliché, and then filling the resin BM in the grooves, as illustrated in FIGS. 3A-3C.

As illustrated in FIG. 3A, a printing roll 231 having a plurality of grooves 232 thereon is prepared. The printing roll 231 is rotated such that a predetermined region of the roller is submerged in a container 220. The container 220 is filled with a black matrix resin 234. As the roller is rotated, the surface of the printing roller 231 is pushed with a blade 238 to remove the resin 234 from the surface, thereby filling the grooves 232 with the resin 234. Thus, after preparing first and second printing rollers 231*a* and 231*b* in which first resin BM patterns 234*a* and second resin BM patterns 234*b* are filled therein, respectively, as illustrated in FIG. 3C, the first printing roll 231*a* is rotated across the surface of a substrate 240, such that the roller comes into contact with the substrate, thereby transferring the first resin BM patterns 234*a* onto the substrate 240. As a result, first black matrixes 234*a*' are formed. Afterwards, second black matrixes 234*b*' are formed on the first black matrixes 234*a*' by rotating the second printing roll 231*b*. Therefore, the grooves formed on the printing roll must be the same as patterns of the black matrixes to be formed.

Figure 4A:
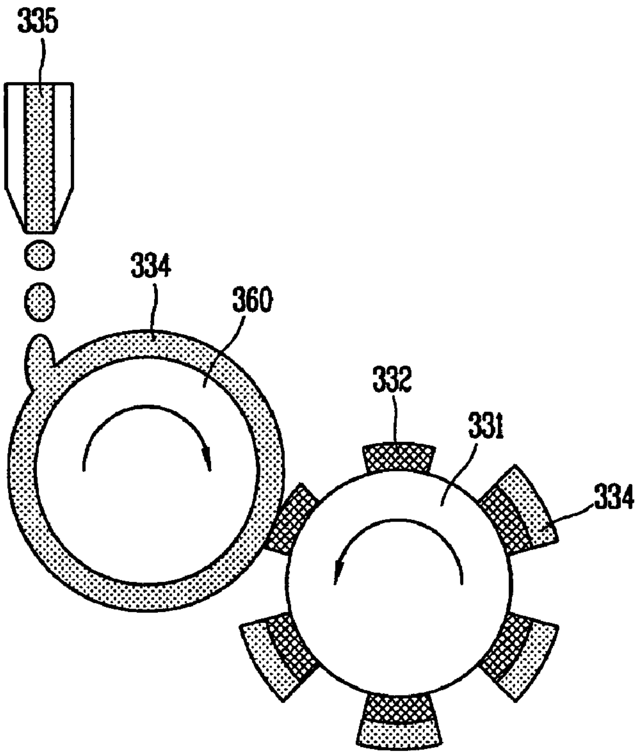
FIGS. 4A to 4C illustrate a method for forming the black matrixes according to a third embodiment of the invention.
Figure 4B:
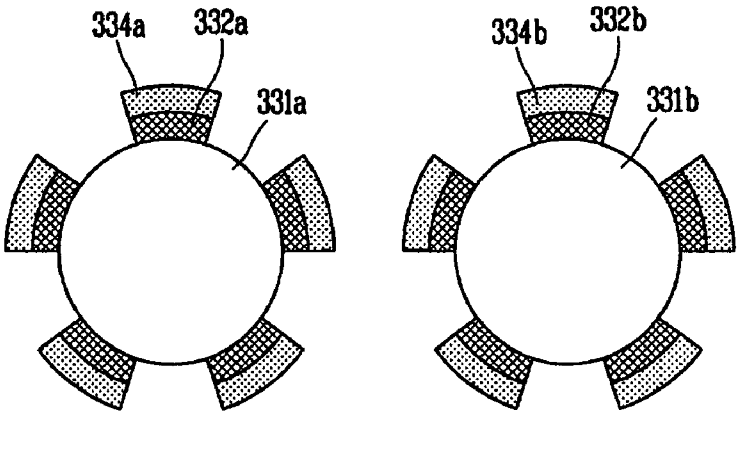
Figure 4C:
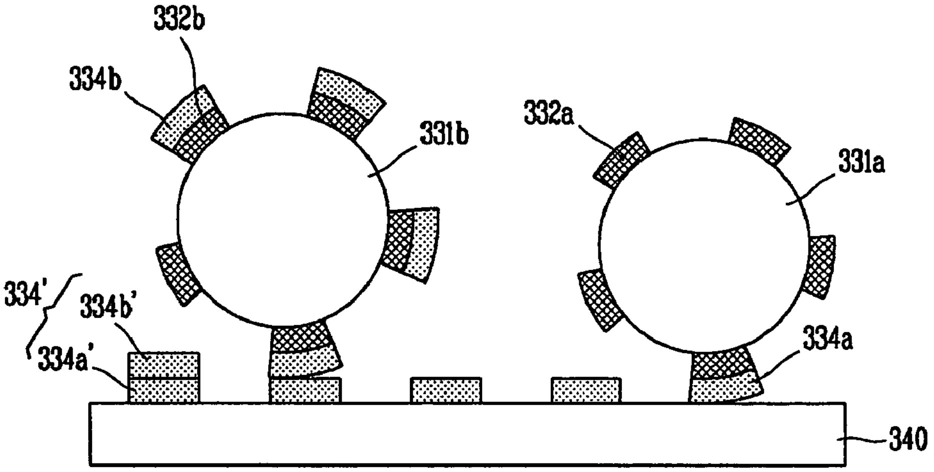

According to a third embodiment of the present invention, the black matrixes are printed on the substrate using a printing roller having convex patterns corresponding the shapes of the black matrixes to be formed as illustrated in FIGS. 4A-4C.

As illustrated in FIG. 4A, a printing roller 331 having a plurality of convex patterns 332 corresponding to the shape of the black matrixes to be formed is provided, and a black matrix resin is deposited on the surface of the convex patterns to form resin BM patterns 334. The resin is deposed on the convex patterns by rotating the printin roller 331 such that is comes into contact with a resin supply roller 360. As the resin supply roller 360 engages with the printing roll 331, the resin 334 applied over the surface of the resin supply roller 360 by a resin supplier 335 is transferred onto the convex patterns 332 of the printing roll 331.

As illustrated in FIG. 4B, a first printing roll 331*a* having first convex patterns 332*a* on which first resin BM patterns 334*a* are transferred and a second printing roll 331*b* having second convex patterns 332*b* on which second resin BM patterns 334*b* are transferred are prepared according to the above-described process.

As illustrated in FIG. 4C, the first resin BM patterns 334 are transferred to a substrate 340 by rotating the first printing roll 331*a* such that it comes into contact with the surface of the substrate 340, thereby forming first black matrixes 334*a*'. Thereafter, the second black matrixes 334*b*' are formed on the first black matrixes 334*a*' by rotating the second printing roller 331*b* across the substrate. Therefore, the convex pattern formed on the printing roll must be the same as the pattern of the black matrix.

Figure 5:
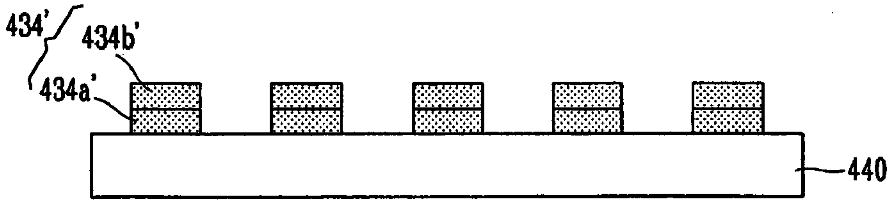
FIG. 5 is a cross-sectional view illustrating black matrixes formed by the printing method according to the present invention.

FIG. 5 illustrates black matrixes 434' formed on a substrate 440 through any one of the aforementioned methods. Although only two layers are shown in FIG. 5, third black matrix layer (not shown) may be additionally formed on the second black matrixes 434*b*'. As the number of layers of the black matrixes increases, light blocking effect can be further improved.

Figure 6:
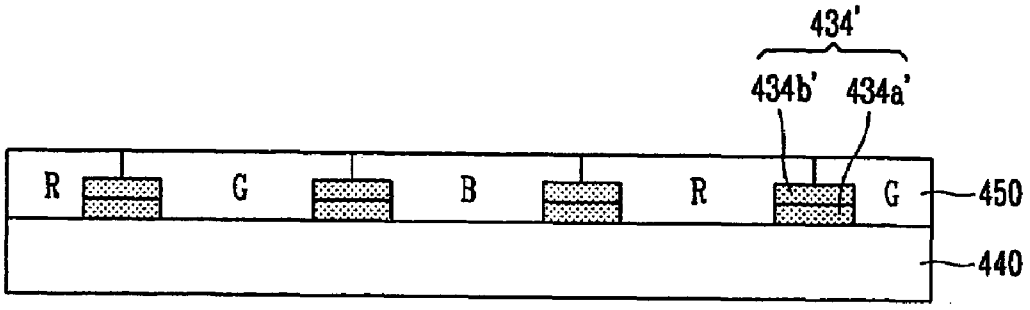
FIG. 6 is a cross-sectional view illustrating black matrixes formed at a lower portion of a color filter.
Figure 7:
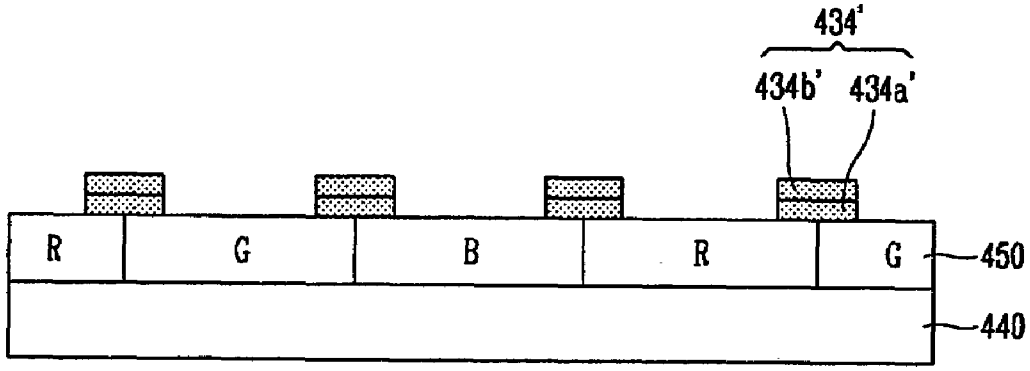
FIG. 7 is a cross-sectional view illustrating black matrixes formed at an upper portion of the color filter.

Moreover, as illustrated in FIG. 6, a color filter layer 450 having R, G, B colors is formed on the substrate 440, and the black matrixes 434' are formed at a boundaries of the respective colors. The black matrixes 434' can be formed at a lower portion of the color filter layer 450, as illustrated in FIG. 6, or formed at an upper portion of the color filter layer 450 as illustrated in FIG. 7.

As aforementioned, the present invention provides a method for forming black matrixes of a liquid crystal display device using a printing method. Particularly, by employing the printing method, at least two layers of black matrixes can be formed by applying a resin BM thereto.

Furthermore, in the present invention, even if using the resin BM, the thickness of the black matrix can be easily adjusted, so as to omit an overcoat layer.

As described so far, in the present invention, black matrixes having multi-layers are formed by a printing method, which results in increasing light blocking efficiency and thus improving qualities of products.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for forming black matrixes in a liquid crystal display device comprising:

providing a transparent substrate;

printing first black matrixes on the substrate using a first printing roll; and printing second black matrixes on the first black matrixes using a second printing roll, wherein the first printing roll and the second printing roll are continuously rotating on the substrate to form continuously the first black matrixes and the second black matrixes.

2. The method of claim 1, wherein printing the first black matrixes comprises:

providing a first cliché having a plurality of grooves;

filling the plurality of grooves with a black matrix resin;

transferring the black matrix resin filled in the grooves onto a first printing roller by rotating the first printing roller across the surface of the first cliche; and transferring the black matrix resin transferred onto the first printing roller onto the substrate.

3. The method of claim 1, wherein printing the second black matrixes comprises:

providing a second cliche having a plurality of grooves;

filling the plurality of grooves on the second cliché with a black matrix resin;

transferring the black matrix resin filled in the grooves onto a second printing roller by rotating the second printing roller across the surface of the second cliché; and transferring the black matrix resin transferred onto the second printing roller onto the first black matrixes.

4. The method of claim 3, wherein the first and second clichés are cylindrical in shape.

5. The method of claim 1, wherein the first black matrixes have the same sizes as those of the second black matrixes.

6. The method of claim 1, wherein the first black matrixes have different sizes from those of the second black matrixes.

7. The method of claim 1, further comprising:

forming nano particle layers on the first black matrixes.

8. The method of claim 1, further comprising:

irradiating the first black matrixes with heat or UV.

9. The method of claim 1, further comprising:

printing third black matrixes on the second black matrixes.

10. A method for forming black matrixes in a liquid crystal display device comprising:

providing first and second printing rollers having a plurality of convex patterns corresponding to patterns of the black matrixes to be formed;

depositing a black matrix resin on the convex patterns;

forming first black matrixes on a substrate by rotating the first printing roller across the surface of the substrate such that the black matrix resin deposited on the convex patterns of the first printing roller is transferred onto the substrate; and forming second black matrixes directly on the first black matrixes by rotating the second printing roller across the substrate such that the black matrix deposited on the convex patterns of the second printing roller is transferred onto the first black matrixes formed on the substrate, wherein the first printing roll and the second printing roll are continuously rotating on the substrate to form continuously the first black matrixes and the second black matrixes.

* * * * *